US011696236B2

(12) United States Patent
Islam et al.

(10) Patent No.: US 11,696,236 B2
(45) Date of Patent: Jul. 4, 2023

(54) TECHNIQUES FOR SELECTING AN UPLINK BEAM

(71) Applicant: QUALCOMM Incorporated, San Diego, CA (US)

(72) Inventors: Muhammad Nazmul Islam, Littleton, MA (US); Navid Abedini, Basking Ridge, NJ (US); Jianghong Luo, Skillman, NJ (US); Tao Luo, San Diego, CA (US); Alessio Marcone, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 188 days.

(21) Appl. No.: 17/115,467

(22) Filed: Dec. 8, 2020

(65) Prior Publication Data
US 2021/0250875 A1 Aug. 12, 2021

Related U.S. Application Data

(60) Provisional application No. 62/972,489, filed on Feb. 10, 2020.

(51) Int. Cl.
*H04W 52/24* (2009.01)
*H04W 16/28* (2009.01)
*H04L 5/00* (2006.01)

(52) U.S. Cl.
CPC ......... *H04W 52/241* (2013.01); *H04L 5/0048* (2013.01); *H04W 16/28* (2013.01)

(58) Field of Classification Search
CPC . H04W 52/241; H04W 16/28; H04W 52/367; H04L 5/0048; H04L 5/005; H04L 5/0023; H04B 7/0695

USPC ........................................................ 455/522
See application file for complete search history.

(56) References Cited

U.S. PATENT DOCUMENTS

| 2018/0227094 | A1* | 8/2018 | Liu | ............... | H04W 72/046 |
| 2020/0112966 | A1* | 4/2020 | Liu | ............... | H04B 17/382 |
| 2021/0022083 | A1 | 1/2021 | Takahashi et al. | | |

FOREIGN PATENT DOCUMENTS

WO 2019193723 A1 10/2019

OTHER PUBLICATIONS

International Search Report and Written Opinion—PCT/US2020/064091—ISA/EPO—dated May 21, 2021.
Partial International Search Report—PCT/US2020/064091—ISA/EPO—dated Mar. 30, 2021.

* cited by examiner

*Primary Examiner* — Shaima Q Aminzay
(74) *Attorney, Agent, or Firm* — Dalei Dong; Harrity & Harrity, LLP

(57) ABSTRACT

Various aspects of the present disclosure generally relate to wireless communication. In some aspects, a wireless communication device may transmit a set of reference signals to a first wireless node; receive information identifying a transmit power capability of the first wireless node based at least in part on transmitting the set of reference signals; and configure one or more transmission parameters for a first link with the first wireless node or a second link with a second wireless node based at least in part on the transmit power capability of the first wireless node. Numerous other aspects are provided.

20 Claims, 13 Drawing Sheets

TECHNIQUES FOR SELECTING AN UPLINK BEAM

CROSS-REFERENCE TO RELATED APPLICATION

This Patent Applications claims priority to U.S. Provisional Patent Application No. 62/972,489, filed on Feb. 10, 2020, entitled "TECHNIQUES FOR SELECTING AN UPLINK BEAM," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for selecting an uplink beam.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include transmitting a set of reference signals to a first wireless node; receiving information identifying a transmit power capability of the first wireless node based at least in part on transmitting the set of reference signals; and configuring one or more transmission parameters for a first link with the first wireless node or a second link with a second wireless node based at least in part on the transmit power capability of the first wireless node.

In some aspects, configuring the one or more transmission parameters includes configuring the one or more transmission parameters based at least in part on at least one of a specification definition or a power class of the first wireless node. In some aspects, the transmit power capability is determined based at least in part on a measurement of the set of reference signals. In some aspects, the one or more transmission parameters are based at least in part on a received beam-correspondence indication. In some aspects, the method includes determining a power threshold; providing information identifying the power threshold to the second wireless node; and receiving a reference signal report from the second wireless node based at least in part on providing the information identifying the power threshold; and configuring the one or more transmission parameters includes configuring the one or more transmission parameters based at least in part on the reference signal report. In some aspects, configuring the one or more transmission parameters includes configuring uplink sounding reference signal sweeping for the second wireless node.

In some aspects, the uplink sounding reference signal is based at least in part on a reference signal received power for the first link. In some aspects, a downlink beam pair selected for the first link is different from an uplink beam selected for the second link. In some aspects, a transmission configuration indicator state for the first link is different from a spatial relation for the second link. In some aspects, configuring the one or more transmission parameters includes altering a beam direction or a beam spread. In some aspects, altering the receive beam configuration includes altering a receive beam configuration for the first link.

In some aspects, a method of wireless communication, performed by a wireless communication device, may include transmitting a plurality of repetitions of a set of reference signals; receiving a report of a set of channel quality measurements based at least in part on the transmission of the plurality of repetitions; and selecting a reference signal based at least in part on the plurality of repetitions of the set of reference signals to enable receipt of an uplink transmission from a first wireless node associated with a first link, of a plurality of wireless nodes associated with a plurality of links, based at least in part on the report.

In some aspects, the method includes selecting a receive beam for the uplink transmission based at least in part on a transmission time of the selected reference signal among the plurality of the repetitions of the set of reference signals. In some aspects, the selected reference signal is at least one of a synchronization signal block, a channel state information reference signal, or a tracking reference signal. In some aspects, the set of channel quality measurements includes at least one of a reference signal received power measurement, a reference signal received quality measurement, a received signal strength indicator value, or a signal to interference noise ratio measurement. In some aspects, the method includes causing the first wireless node to sweep a plurality of quasi co-located receive beams, and selecting the reference signal includes selecting the reference signal based at least in part on causing the first wireless node to sweep the plurality of quasi co-located receive beams.

In some aspects, a method of wireless communication, performed by a user equipment (UE), may include receiving a set of reference signals from a first wireless node; selecting, for channel quality reporting, a reference signal among the set of reference signals based at least in part on an interference criterion, wherein the reference signal is selected such that a UE beam corresponding to the reference signal does not interfere with a second wireless node; and transmitting, to the first wireless node, a channel quality report using the UE beam corresponding to the reference signal.

In some aspects, selecting the reference signal includes selecting the reference signal based at least in part on a channel quality of a neighbor cell associated with the second wireless node. In some aspects, the channel quality of the neighbor cell is at least one of a threshold reference signal received power, a threshold received signal strength indicator, or reference signal received quality. In some aspects, selecting the reference signal includes selecting the reference signal based at least in part on a channel quality of a serving cell of the first wireless node. In some aspects, the channel quality is a threshold level of a reference signal received quality. In some aspects, the threshold is defined in a specification or network-configurable.

In some aspects, a method of wireless communication, performed by a UE, may include receiving a reference signal from a first wireless node; determining a reference signal received power (RSRP) of the reference signal from the first wireless node and a corresponding UE beam; determining a strongest RSRP for a second wireless node based at least in part on the UE beam; and reporting the RSRP of the reference signal from the first wireless node and the strongest RSRP for the second wireless node to the first wireless node.

In some aspects, a wireless communication device for wireless communication may include a memory and one or more processors operatively coupled to the memory. The memory and the one or more processors may be configured to transmit a set of reference signals to a first wireless node; receive information identifying a transmit power capability of the first wireless node based at least in part on transmitting the set of reference signals; and configure one or more transmission parameters for a first link with the first wireless node or a second link with a second wireless node based at least in part on the transmit power capability of the first wireless node.

In some aspects, a wireless communication device for wireless communication may include a memory and one or more processors operatively coupled to the memory. The memory and the one or more processors may be configured to transmit a plurality of repetitions of a set of reference signals; receive a report of a set of channel quality measurements based at least in part on the transmission of the plurality of repetitions; and select a reference signal based at least in part on the plurality of repetitions of the set of reference signals to enable receipt of an uplink transmission from a first wireless node associated with a first link, of a plurality of wireless nodes associated with a plurality of links, based at least in part on the report.

In some aspects, a UE for wireless communication may include a memory and one or more processors operatively coupled to the memory. The memory and the one or more processors may be configured to receive a set of reference signals from a first wireless node; select, for channel quality reporting, a reference signal among the set of reference signals based at least in part on an interference criterion, wherein the reference signal is selected such that a UE beam corresponding to the reference signal does not interfere with a second wireless node; and transmit, to the first wireless node, a channel quality report using the UE beam corresponding to the reference signal.

In some aspects, a UE for wireless communication may include a memory and one or more processors operatively coupled to the memory. The memory and the one or more processors may be configured to receive a reference signal from a first wireless node; determine an RSRP of the reference signal from the first wireless node and a corresponding UE beam; determine a strongest RSRP for a second wireless node based at least in part on the UE beam; and report the RSRP of the reference signal from the first wireless node and the strongest RSRP for the second wireless node to the first wireless node.

In some aspects, a non-transitory computer-readable medium may store one or more instructions for wireless communication. The one or more instructions, when executed by one or more processors of a wireless communication device, may cause the one or more processors to transmit a set of reference signals to a first wireless node; receive information identifying a transmit power capability of the first wireless node based at least in part on transmitting the set of reference signals; and configure one or more transmission parameters for a first link with the first wireless node or a second link with a second wireless node based at least in part on the transmit power capability of the first wireless node.

In some aspects, a non-transitory computer-readable medium may store one or more instructions for wireless communication. The one or more instructions, when executed by one or more processors of a wireless communication device, may cause the one or more processors to transmit a plurality of repetitions of a set of reference signals; receive a report of a set of channel quality measurements based at least in part on the transmission of the plurality of repetitions; and select a reference signal based at least in part on the plurality of repetitions of the set of reference signals to enable receipt of an uplink transmission from a first wireless node associated with a first link, of a plurality of wireless nodes associated with a plurality of links, based at least in part on the report.

In some aspects, a non-transitory computer-readable medium may store one or more instructions for wireless communication. The one or more instructions, when executed by one or more processors of a UE, may cause the one or more processors to receive a set of reference signals from a first wireless node; select, for channel quality reporting, a reference signal among the set of reference signals based at least in part on an interference criterion, wherein the reference signal is selected such that a UE beam corresponding to the reference signal does not interfere with a second wireless node; and transmit, to the first wireless node, a channel quality report using the UE beam corresponding to the reference signal.

In some aspects, a non-transitory computer-readable medium may store one or more instructions for wireless communication. The one or more instructions, when executed by one or more processors of a UE, may cause the one or more processors to receive a reference signal from a first wireless node; determine an RSRP of the reference signal from the first wireless node and a corresponding UE beam; determine a strongest RSRP for a second wireless node based at least in part on the UE beam; and report the RSRP of the reference signal from the first wireless node and the strongest RSRP for the second wireless node to the first wireless node.

In some aspects, an apparatus for wireless communication may include means for transmitting a set of reference signals to a first wireless node; means for receiving information identifying a transmit power capability of the first wireless node based at least in part on transmitting the set of reference signals; and means for configuring one or more transmission parameters for a first link with the first wireless node or a second link with a second wireless node based at least in part on the transmit power capability of the first wireless node.

In some aspects, an apparatus for wireless communication may include means for transmitting a plurality of repetitions of a set of reference signals; means for receiving a report of a set of channel quality measurements based at least in part on the transmission of the plurality of repetitions; and means for selecting a reference signal based at least in part on the plurality of repetitions of the set of reference signals to enable receipt of an uplink transmission from a first wireless node associated with a first link, of a plurality of wireless nodes associated with a plurality of links, based at least in part on the report.

In some aspects, an apparatus for wireless communication may include means for receiving a set of reference signals from a first wireless node; means for selecting, for channel quality reporting, a reference signal among the set of reference signals based at least in part on an interference criterion, wherein the reference signal is selected such that a UE beam corresponding to the reference signal does not interfere with a second wireless node; and means for transmitting, to the first wireless node, a channel quality report using the UE beam corresponding to the reference signal.

In some aspects, an apparatus for wireless communication may include means for receiving a reference signal from a first wireless node; means for determining an RSRP of the reference signal from the first wireless node and a corresponding UE beam; means for determining a strongest RSRP for a second wireless node based at least in part on the UE beam; and means for reporting the RSRP of the reference signal from the first wireless node and the strongest RSRP for the second wireless node to the first wireless node.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
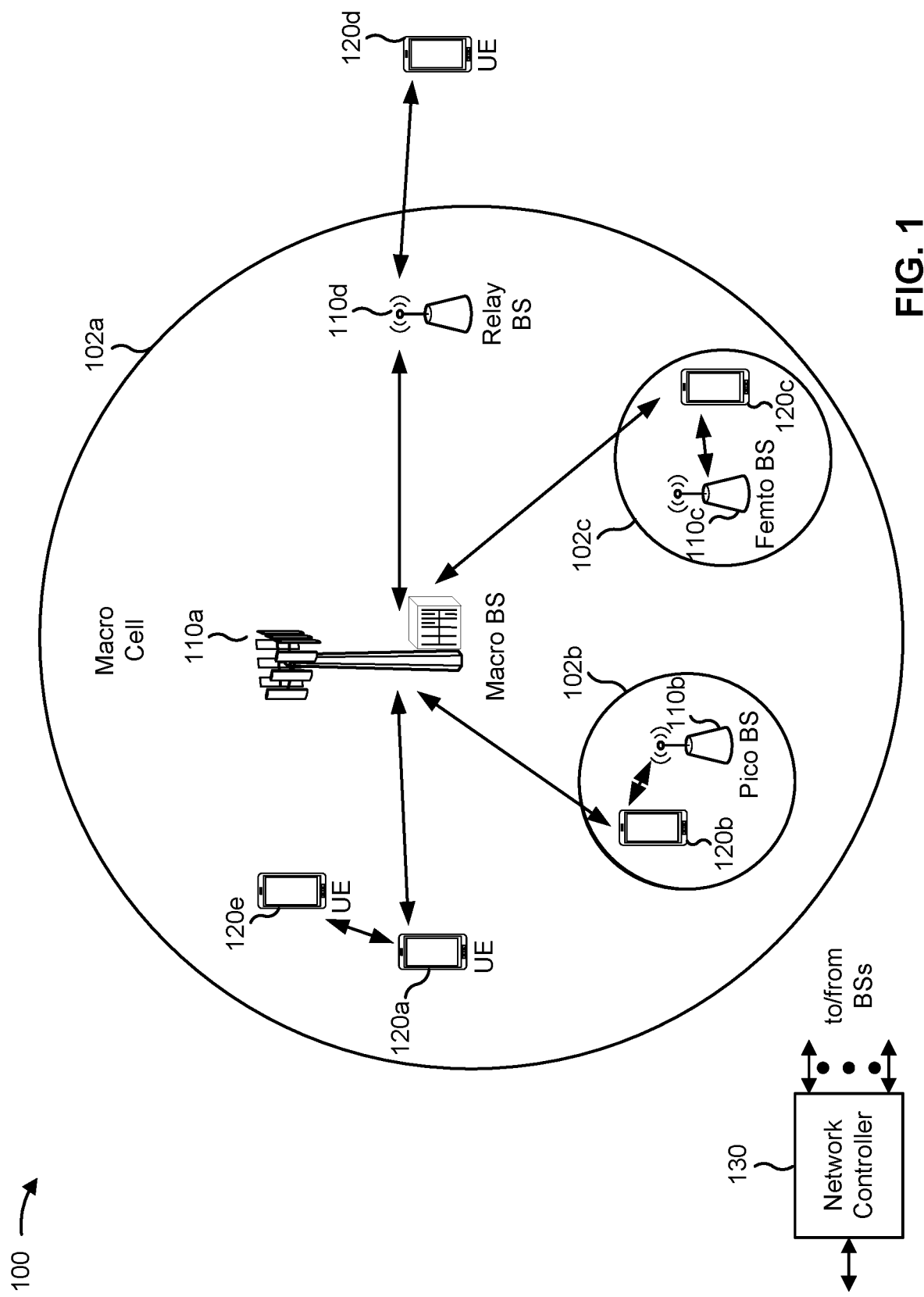
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
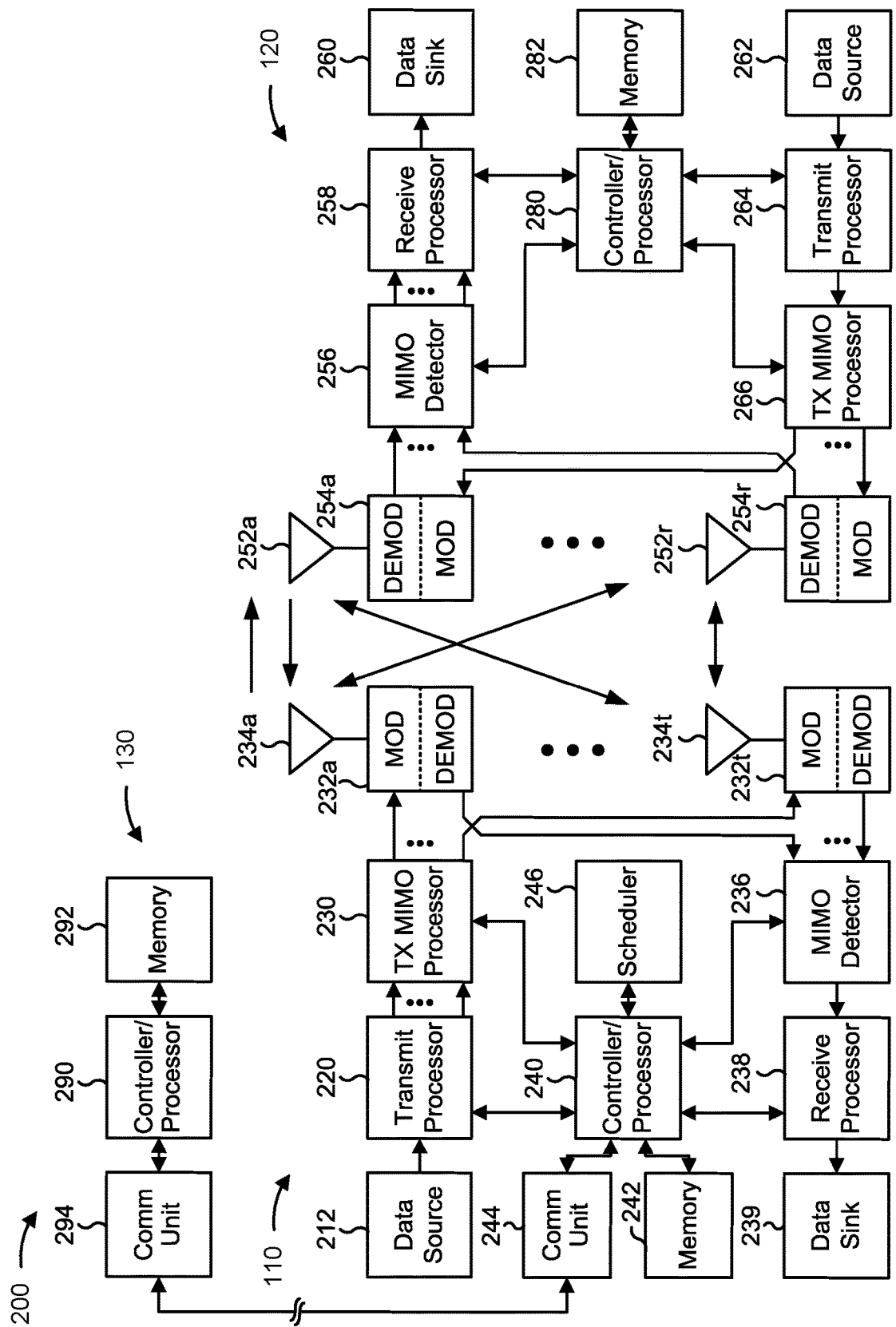
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a process for selecting an uplink beam, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, process 900 of FIG. 9, and/or other processes as described herein. A scheduler 246 may schedule UEs for data transmission on the downlink and/or uplink.

In some aspects, UE 120 may include means for receiving a set of reference signals from a first wireless node, means for selecting, for channel quality reporting, a reference signal among the set of reference signals based at least in part on an interference criterion, means for transmitting, to the first wireless node, a channel quality report using the UE beam corresponding to the reference signal, and/or the like.

In some aspects, UE 120 may include means for receiving a reference signal from a first wireless node, means for determining a reference signal received power (RSRP) of the reference signal from the first wireless node and a corresponding UE beam, means for determining a strongest RSRP for a second wireless node based at least in part on the UE beam, means for reporting the RSRP of the reference signal from the first wireless node and the strongest RSRP for the second wireless node to the first wireless node, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a wireless communication device (e.g., a UE 120 or a base station 110) may include means for transmitting a set of reference signals to a first wireless node, means for receiving information identifying a transmit power capability of the first wireless node based at least in part on transmitting the set of reference signals, means for configuring one or more transmission parameters for a first link with the first wireless node or a second link with a second wireless node based at least in part on the transmit power capability of the first wireless node, and/or the like. In some aspects, the wireless communication device may include means for transmitting a plurality of repetitions of a set of reference signals, means for receiving a report of a set of channel quality measurements based at least in part on the transmission of the plurality of repetitions, means for selecting a reference signal based at least in part on the plurality of repetitions of the set of reference signals to enable receipt of an uplink transmission from a first wireless node associated with a first link, of a plurality of wireless nodes associated with a plurality of links, based at least in part on the report, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3:
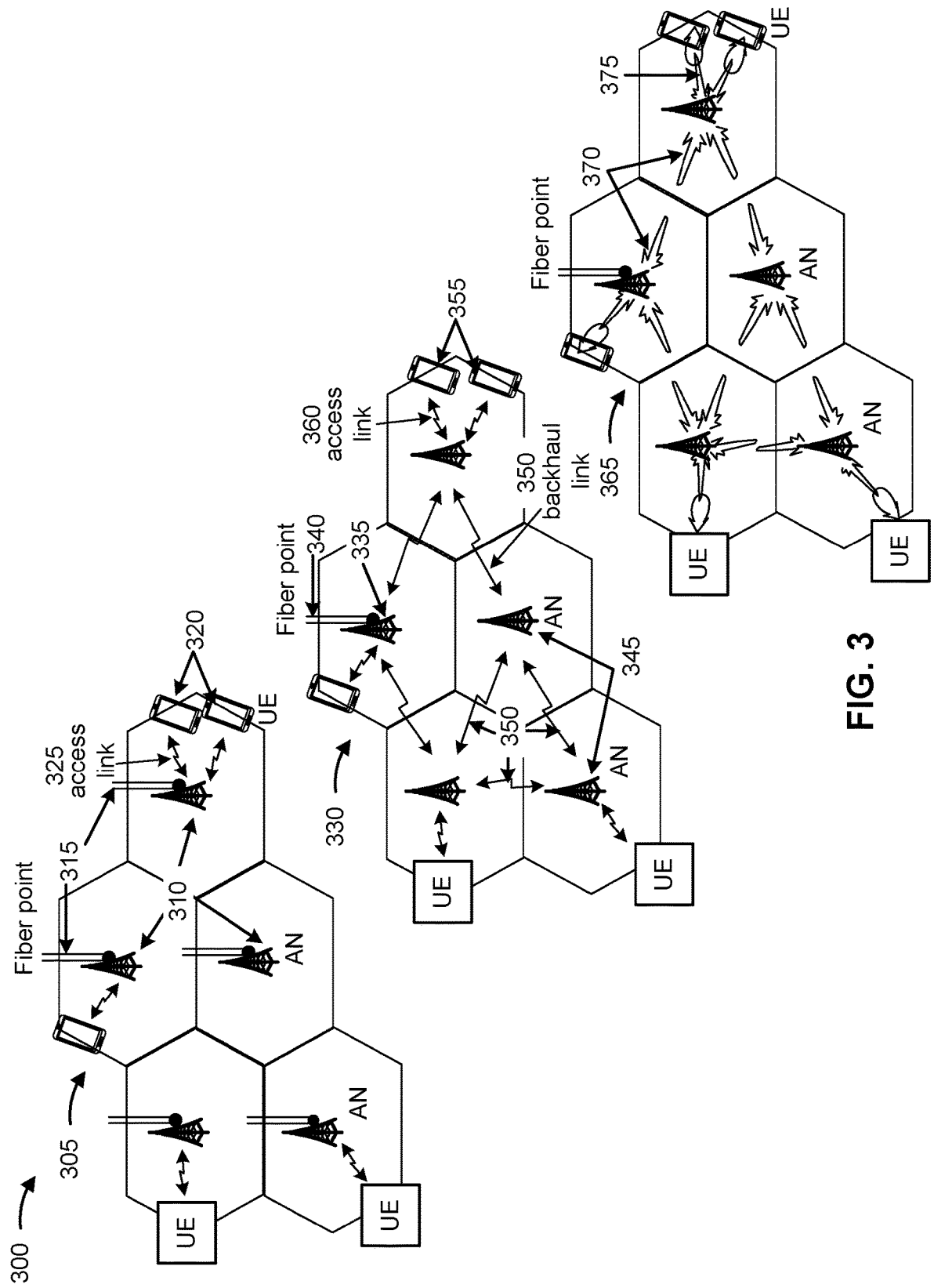
FIG. 3 is a diagram of integrated access and backhauling (IAB)-based radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, "anchor node" may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
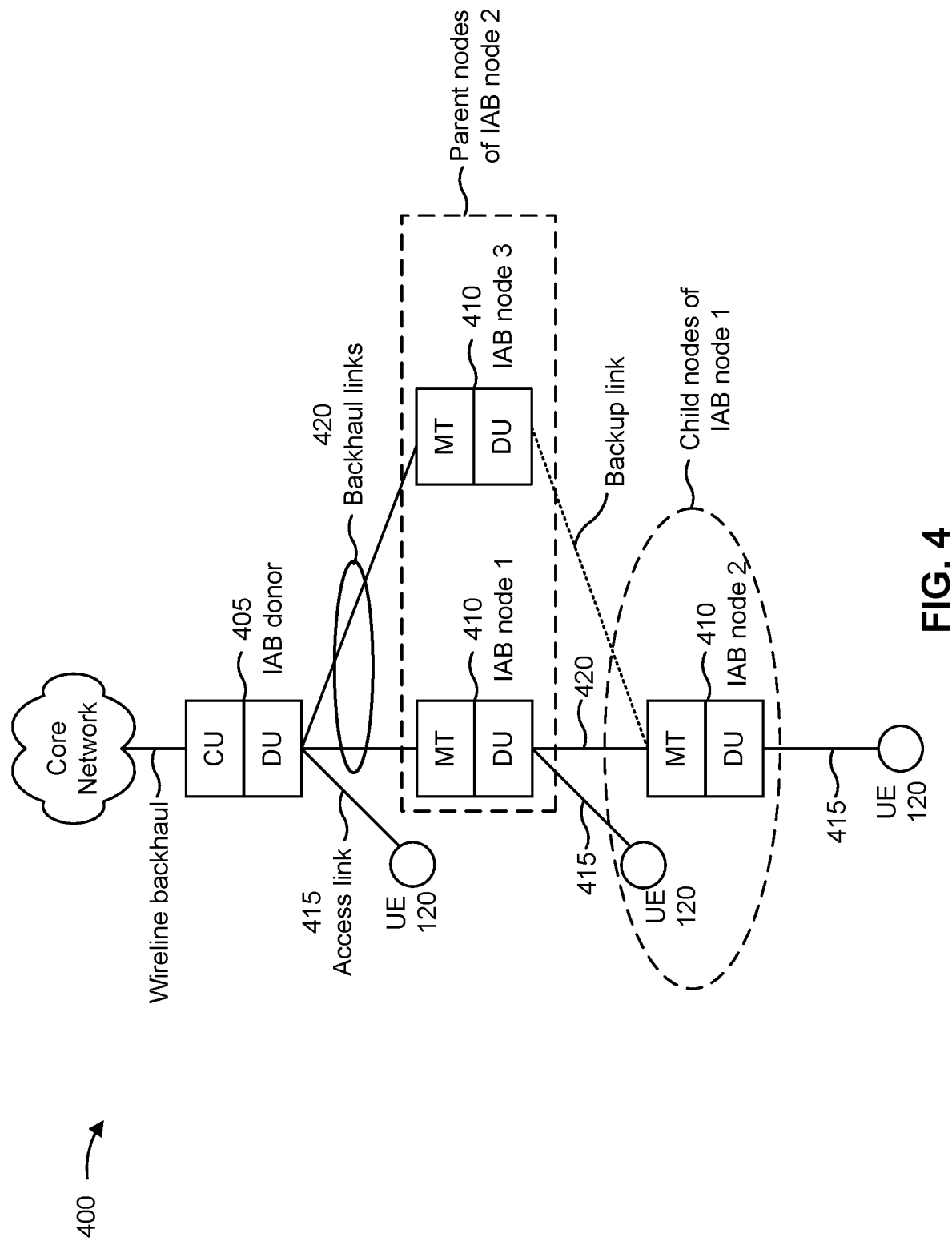
FIG. 4 is a diagram illustrating an example of an IAB network architecture.

FIG. 4 is a diagram illustrating an example 400 of an IAB network architecture, in accordance with various aspects of the disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. IAB node 410 and/or other IAB nodes may also be referred to as wireless nodes, wireless communication devices, or referred to with respect to apparatuses that are used to implement an IAB node, such as a UE, a BS, a MTC device, and/or the like.

A CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link between IAB-node 2 and IAB-node 3 may be used for backhaul communications if a primary backhaul link between IAB-node 2 and IAB-node 1 fails. As used herein, a node, wireless communication device, or a wireless node may refer to an IAB donor 405 or an IAB node 410.

As indicated above, FIG. 4 is provided as an example. Other examples may differ from what is described with regard to FIG. 4.

In some communications systems, such as IAB network based communication systems described above, an IAB MT may be associated with a higher minimum uplink transmit power than a UE. As a result, when the IAB MT is operating within a threshold proximity of the UE, such as when the IAB MT and UE are both connected to the same parent node, the IAB MT may transmit on an uplink and cause interference for the UE. Such interference may occur when a serving cell (e.g., associated with the parent node) schedules the IAB MT and the UE concurrently. Additionally, the IAB MT may cause interference with neighboring cells and UEs or IAB MTs associated therewith.

Some aspects described herein enable beam selection to reduce interference. For example, the IAB MT, the parent node, and/or the UE may communicate to select an uplink reference signal and a corresponding uplink transmit beam for the IAB MT, such that interference can be reduced relative to other possible selections. In this case, the parent node may configure the IAB MT to transmit uplink sounding reference signal (SRS) transmissions such that a received power at the parent node is less than a threshold that causes interference. In this way, the parent node, the IAB MT, and/or the UE may reduce interference in an IAB network, thereby improving communications.

Figure 5A:
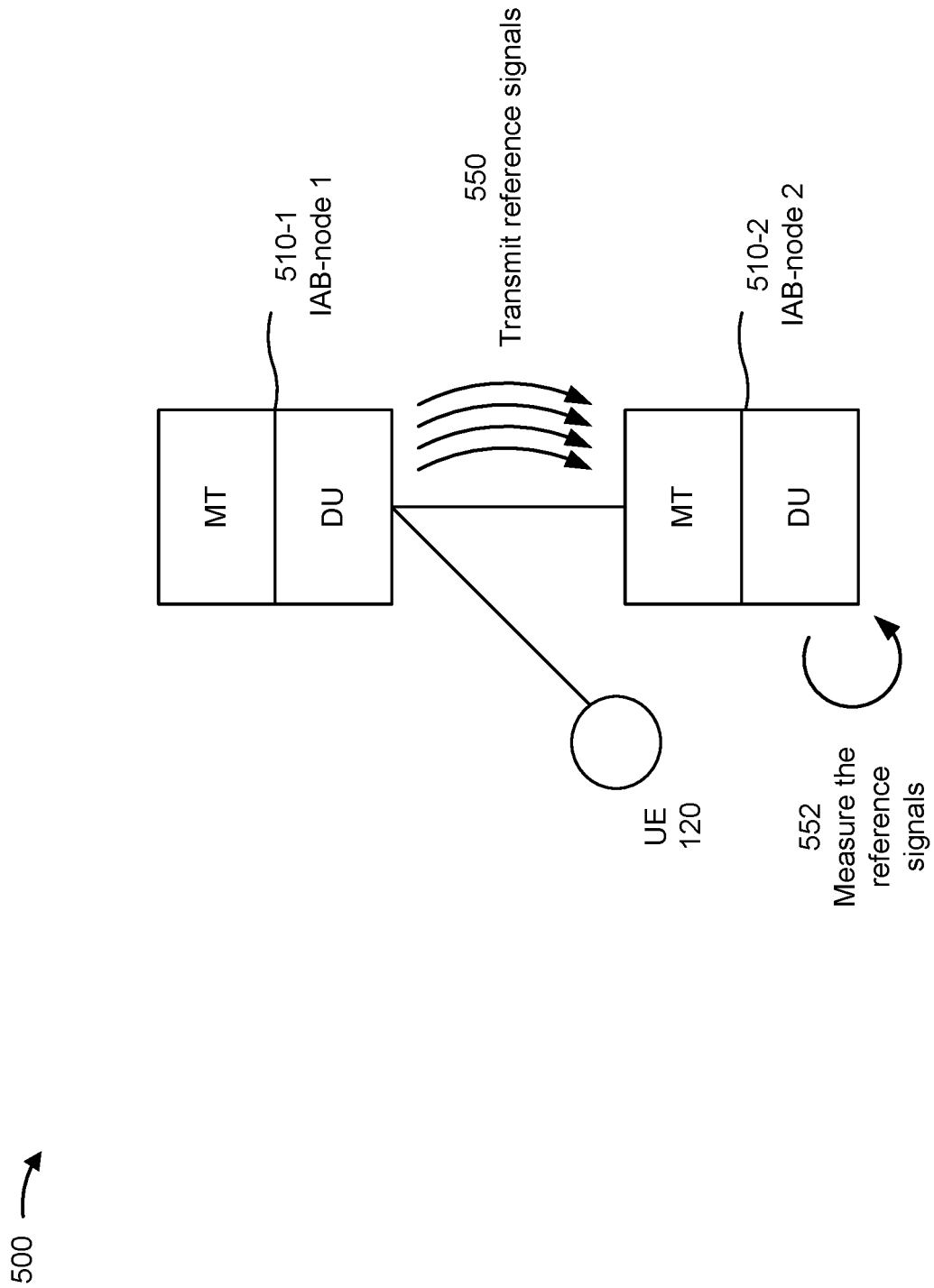
FIGS. 5A-5C are diagrams illustrating an example of selecting an uplink beam, in accordance with various aspects of the present disclosure.
Figure 5B:
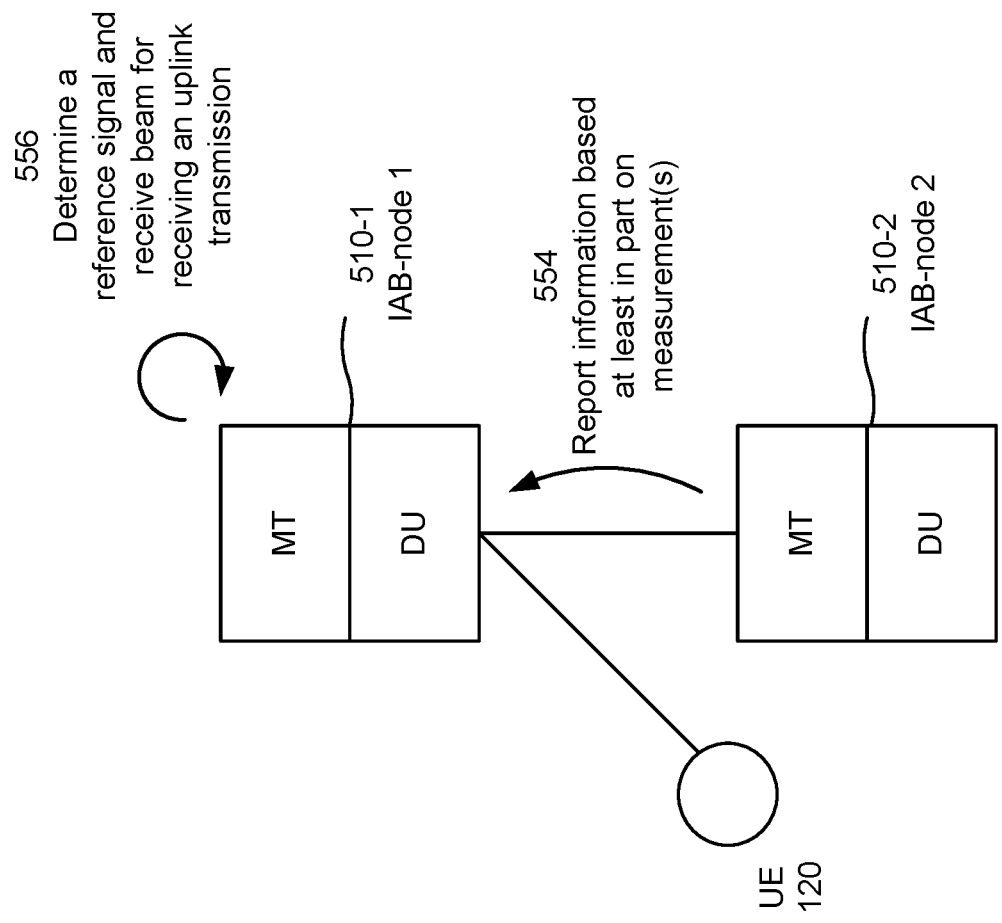
Figure 5C:
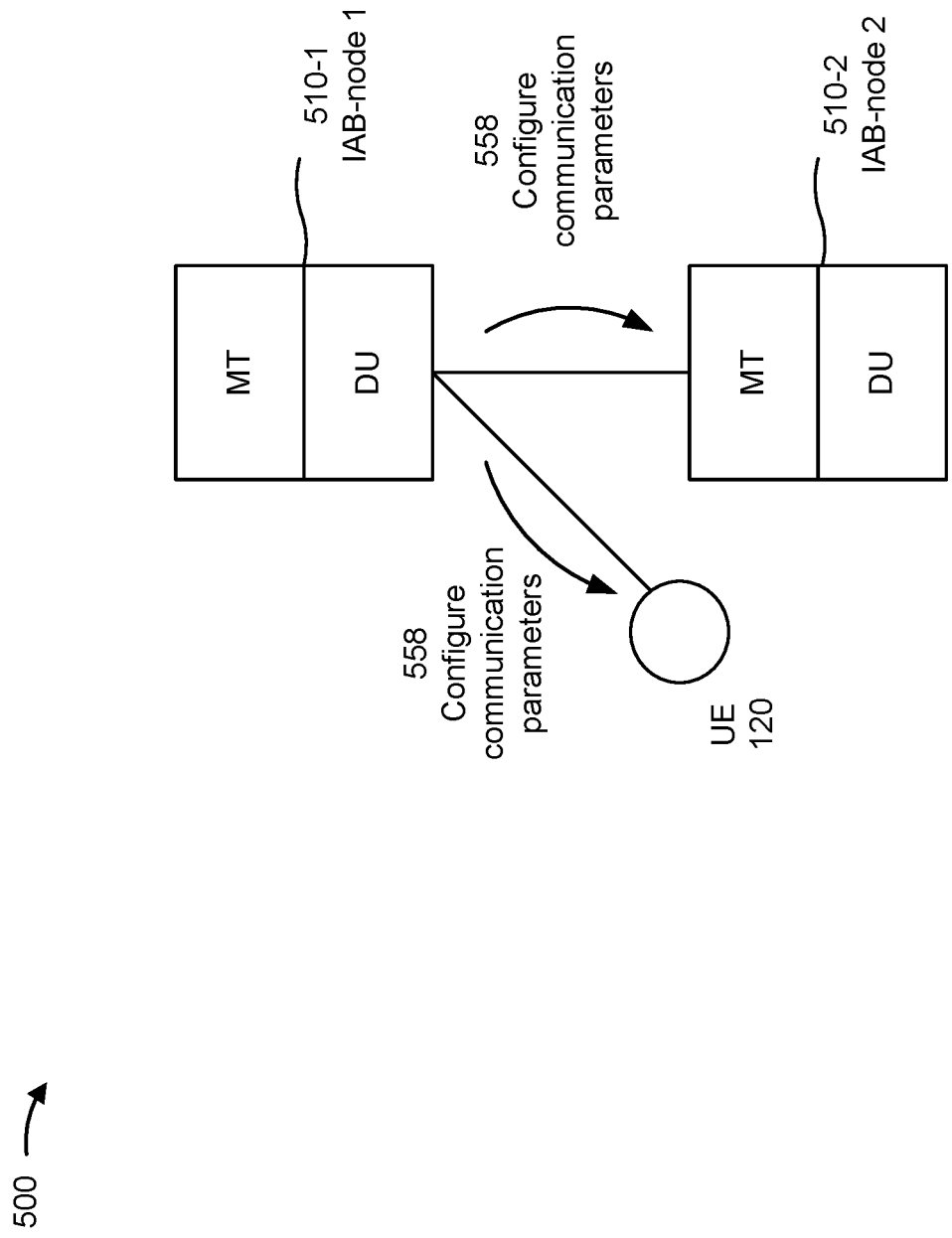

FIGS. 5A-5C are diagrams illustrating an example 500 of selecting an uplink beam, in accordance with various aspects of the present disclosure. As shown in FIGS. 5A-5C, example 500 includes a first IAB node 510-1, a second IAB node 510-2, and a UE 120. IAB nodes 510 may correspond to a wireless node, a node, a wireless communication device, and/or the like, as described above.

As further shown in FIG. 5A, and by reference number 550, IAB node 510-1 may transmit a set of reference signals toward IAB node 510-2. For example, IAB node 510-1 may transmit the set of reference signals, which may include one or more repetitions of one or more reference signals. In other words, IAB node 510-1 may transmit a set of repetitions of a single reference signal, a plurality of sets of repetitions of a plurality of reference signals, a single repetition of each of a plurality of reference signals, a combination thereof, and/or the like. In some aspects, the set of reference signals may include a synchronization signal block (SSB) communication, a channel state information (CSI) reference signal, a tracking reference signal, and/or the like.

As further shown in FIG. 5A, and by reference number 552, IAB node 510-2 may perform one or more channel quality measurements of at least one of the set of reference signals. For example, IAB node 510-2 may determine a reference signal received power (RSRP), a reference signal received quality (RSRQ), a received signal strength indicator (RSSI), and/or the like. In some aspects, IAB node 510-2 may receive, from IAB node 510-1, an indication to perform beam sweeping when receiving the set of reference signals. In this case, IAB node 510-2 may sweep across a plurality of quasi co-located receive beams to identify a beam pair link to use for uplink transmission (e.g., a beam pair link with a threshold channel quality to avoid interference).

As shown in FIG. 5B, and by reference number 554, IAB node 510-2 may report a result of performing a measurement on a reference signal. For example, IAB node 510-2 may provide information identifying an RSRP, an RSRQ, an RSSI, and/or the like. In some aspects, IAB node 510-2 may report a subset of measurements based at least in part on a threshold criterion. For example, IAB node 510-2 may report layer 1 (L1) RSRP values that are less than a threshold. In this case, IAB node 510-2 may receive signaling from IAB node 510-1 identifying the threshold. Additionally, or alternatively, IAB node 510-2 may determine the threshold based at least in part on stored information identifying a specification value. In some aspects, the threshold may be associated with ensuring that a corresponding beam pair link supports an uplink transmission power that is low enough to avoid interference. For example, IAB node 510-2 may receive signaling from IAB Node 510-1 indicating that L1-RSRPs are to be reported for beam pair links with a value of less than, for example, −44 decibel-milliwatts (dBm). In this way, IAB nodes 510 avoid excess network traffic associated with reporting L1-RSRPs for beam pair links for which selection may result in interference.

In some aspects, UE 120 may select a reference signal configuration in connection with interference avoidance by IAB node 510-1. For example, UE 120 may select a receive beam and a beam pair link for L1-RSRP reporting to avoid interference with, for example, IAB node 510-2, another IAB node or UE of another neighboring cell, and/or the like. In this case, UE 120 may select the receive beam to avoid receiving an SSB with a threshold signal strength on the receive beam from a neighbor cell. In some aspects, UE 120 may report a selected serving cell beam pair link (e.g., to IAB node 510-1). For example, UE 120 may report an L1-RSRP corresponding to a beam pair link of a serving cell reference signal. In this case, UE 120 may ensure that a channel quality of a strongest reference signal of a neighbor cell is less than a threshold. Additionally, or alternatively, UE 120 may report a strongest RSRP for a receive beam and/or for a neighbor cell. In this case, IAB node 510-1 may select a reference signal, beam pair link, and/or receive beam for UE 120, as described below, based at least in part on L1-RSRP reporting from UE 120, channel quality reporting from IAB node 510-2, and/or the like.

As further shown in FIG. 5B, and by reference number 556, IAB node 510-1 may determine a reference signal and receive beam for receiving an uplink transmission. In some aspects, IAB node 510-1 may configure beam sweeping for UE 120. For example, IAB node 510-1 may configure uplink SRS beam sweeping for UE 120 based at least in part on a report of an RSRP. In this case, IAB node 510-1 selects a configuration for beam sweeping such that a received RSRP of a selected SRS is less than a threshold uplink receive power to avoid interference. In some aspects, IAB node 510-1 may select a downlink beam pair link and uplink beam pair link that are not paired. For example, IAB node 510-1 may select, based at least in part on the information regarding the set of reference signals, a downlink beam with an active transmission configuration indicator (TCI) state that does not correspond to spatial relationship information of a selected uplink beam.

As shown in FIG. 5C, and by reference number 558, IAB node 510-1 may transmit information to configure communication parameters for IAB node 510-2 and/or UE 120. For example, IAB node 510-1 may transmit using a selected downlink beam and may identify a selected uplink beam for IAB node 510-2 and/or UE 120 to use for subsequent uplink communication.

As indicated above, FIGS. 5A-5C are provided as an example. Other examples may differ from what is described with respect to FIGS. 5A-5C.

Figure 6:
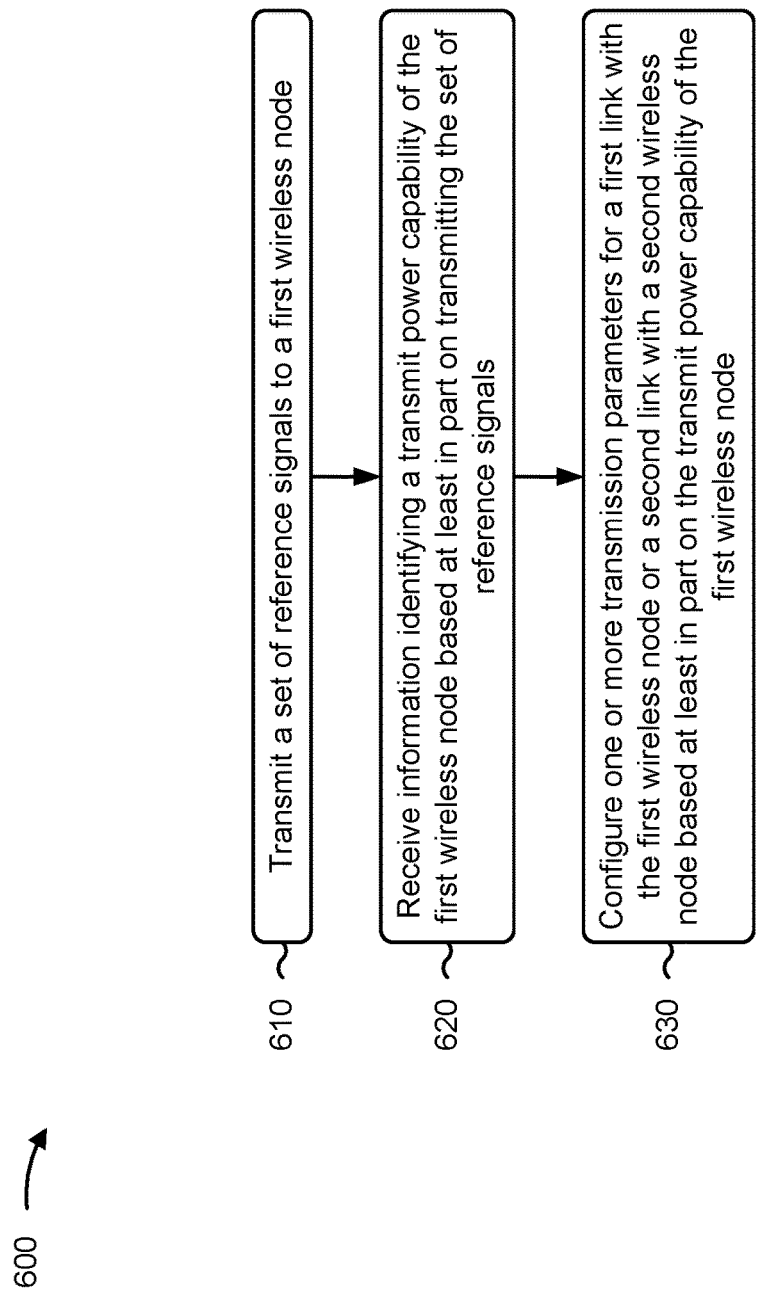
FIG. 6 is a diagram illustrating an example process performed, for example, by a wireless communication device, in accordance with various aspects of the present disclosure.

FIG. 6 is a diagram illustrating an example process 600 performed, for example, by a wireless communication device, in accordance with various aspects of the present disclosure. Example process 600 is an example where the wireless communication device (e.g., BS 110, UE 120, an IAB node 410, an IAB donor 405, an IAB node 510, an apparatus 1002, a wireless node 1050, a wireless node 1150, and/or the like) performs operations associated with selecting an uplink beam.

As shown in FIG. 6, in some aspects, process 600 may include transmitting a set of reference signals to a first wireless node (block 610). For example, the wireless communication device (e.g., antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may transmit a set of reference signals to a first wireless node, as described above.

As further shown in FIG. 6, in some aspects, process 600 may include receiving information identifying a transmit power capability of the first wireless node based at least in part on transmitting the set of reference signals (block 620). For example, the wireless communication device (e.g., antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may receive information identifying a transmit power capability of the first wireless node based at least in part on transmitting the set of reference signals, as described above.

As further shown in FIG. 6, in some aspects, process 600 may include configuring one or more transmission parameters for a first link with the first wireless node or a second link with a second wireless node based at least in part on the transmit power capability of the first wireless node (block 630). For example, the wireless communication device (e.g., antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may configure one or more transmission parameters for a first link with the first wireless node or a second link with a second wireless node based at least in part on the transmit power capability of the first wireless node, as described above.

Process 600 may include additional aspects, such as any single aspect or any combination of aspects described below and/or in connection with one or more other processes described elsewhere herein.

In a first aspect, configuring the one or more transmission parameters includes configuring the one or more transmission parameters based at least in part on at least one of a specification definition or a power class of the first wireless node.

In a second aspect, alone or in combination with the first aspect, the transmit power capability is determined based at least in part on a measurement of the set of reference signals.

In a third aspect, alone or in combination with one or more of the first and second aspects, the one or more transmission parameters are based at least in part on a received beam-correspondence indication.

In a fourth aspect, alone or in combination with one or more of the first through third aspects, process 600 includes determining a power threshold; providing information identifying the power threshold to the second wireless node; and receiving a reference signal report from the second wireless node based at least in part on providing the information identifying the power threshold; and configuring the one or more transmission parameters includes configuring the one or more transmission parameters based at least in part on the reference signal report.

In a fifth aspect, alone or in combination with one or more of the first through fourth aspects, configuring the one or more transmission parameters includes configuring uplink sounding reference signal sweeping for the second wireless node.

In a sixth aspect, alone or in combination with one or more of the first through fifth aspects, the uplink sounding reference signal is based at least in part on a reference signal received power for the first link.

In a seventh aspect, alone or in combination with one or more of the first through sixth aspects, a downlink beam pair selected for the first link is different from an uplink beam selected for the second link.

In an eighth aspect, alone or in combination with one or more of the first through seventh aspects, a transmission configuration indicator state for the first link is different from a spatial relation for the second link.

In a ninth aspect, alone or in combination with one or more of the first through eighth aspects, configuring the one or more transmission parameters includes altering a beam spread or beam direction.

In a tenth aspect, alone or in combination with one or more of the first through ninth aspects, altering the receive beam configuration includes altering a receive beam configuration for the first link.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
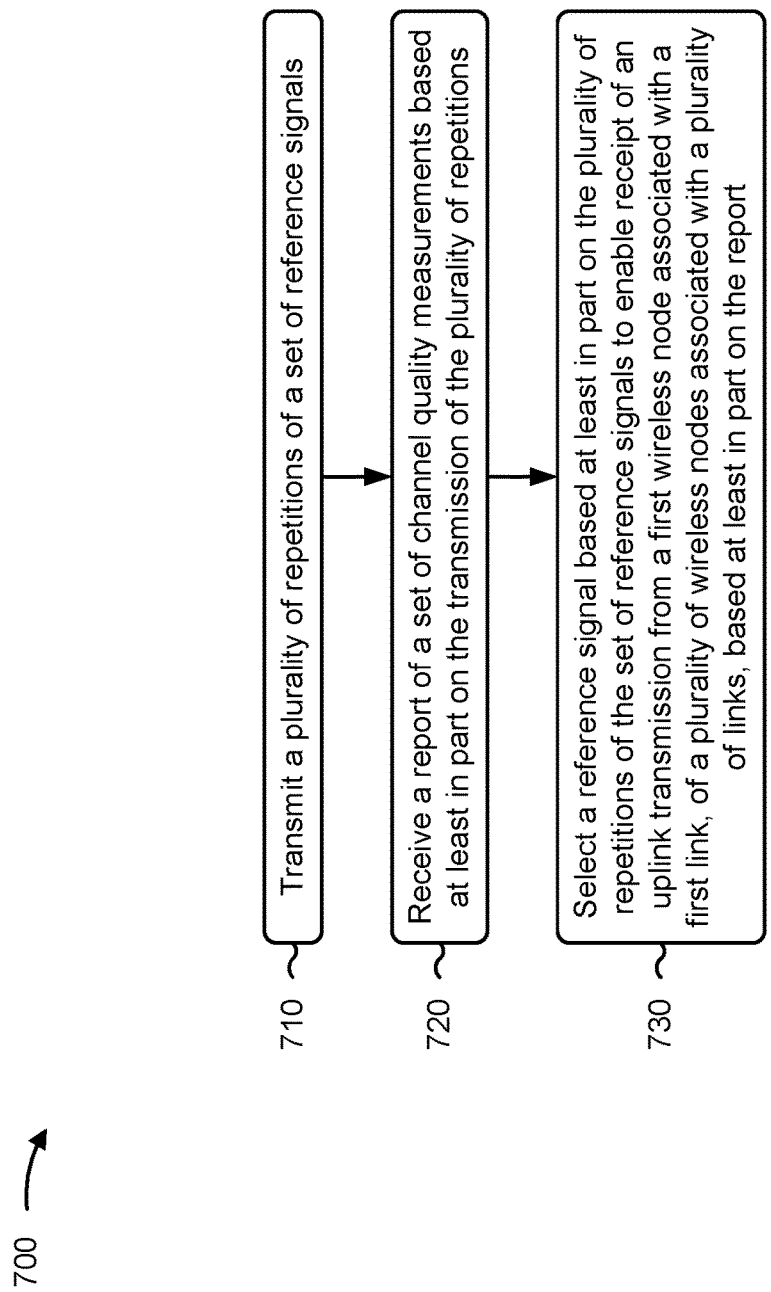
FIG. 7 is a diagram illustrating an example process performed, for example, by a wireless communication device, in accordance with various aspects of the present disclosure.

FIG. 7 is a diagram illustrating an example process 700 performed, for example, by a wireless communication device, in accordance with various aspects of the present disclosure. Example process 700 is an example where the wireless communication device (e.g., BS 110, UE 120, an IAB node 410, an IAB donor 405, an IAB node 510, an apparatus 1002, a wireless node 1050, a wireless node 1150, and/or the like) performs operations associated with selecting an uplink beam.

As shown in FIG. 7, in some aspects, process 700 may include transmitting a plurality of repetitions of a set of reference signals (block 710). For example, the wireless communication device (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may transmit a plurality of repetitions of a set of reference signals, as described above.

As further shown in FIG. 7, in some aspects, process 700 may include receiving a report of a set of channel quality measurements based at least in part on the transmission of the plurality of repetitions (block 720). For example, the wireless communication device (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may receive a report of a set of channel quality measurements based at least in part on the transmission of the plurality of repetitions, as described above.

As further shown in FIG. 7, in some aspects, process 700 may include selecting a reference signal based at least in part on the plurality of repetitions of the set of reference signals to enable receipt of an uplink transmission from a first wireless node associated with a first link, of a plurality of wireless nodes associated with a plurality of links, based at least in part on the report (block 730). For example, the wireless communication device (e.g., using antenna 234, DEMOD 232, MIMO detector 236, receive processor 238, controller/processor 240, transmit processor 220, TX MIMO processor 230, MOD 232, antenna 252, DEMOD 254, MIMO detector 256, receive processor 258, controller/processor 280, transmit processor 264, TX MIMO processor 266, MOD 254, and/or the like) may select a reference signal based at least in part on the plurality of repetitions of the set of reference signals to enable receipt of an uplink transmission from a first wireless node associated with a first link, of a plurality of wireless nodes associated with a plurality of links, based at least in part on the report, as described above.

Process 700 may include additional aspects, such as any single aspect or any combination of aspects described below and/or in connection with one or more other processes described elsewhere herein.

In a first aspect, process 700 includes selecting a receive beam for the uplink transmission based at least in part on a transmission time of the selected reference signal among the plurality of the repetitions of the set of reference signals.

In a second aspect, alone or in combination with the first aspect, the selected reference signal is at least one of a synchronization signal block, a channel state information reference signal, or a tracking reference signal.

In a third aspect, alone or in combination with one or more of the first and second aspects, the set of channel quality measurements includes at least one of a reference signal received power measurement, a reference signal received quality measurement, a received signal strength indicator value, or a signal to interference noise ratio measurement.

In a fourth aspect, alone or in combination with one or more of the first through third aspects, process 700 includes causing the first wireless node to sweep a plurality of quasi co-located receive beams, and selecting the reference signal includes selecting the reference signal based at least in part on causing the first wireless node to sweep the plurality of quasi co-located receive beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
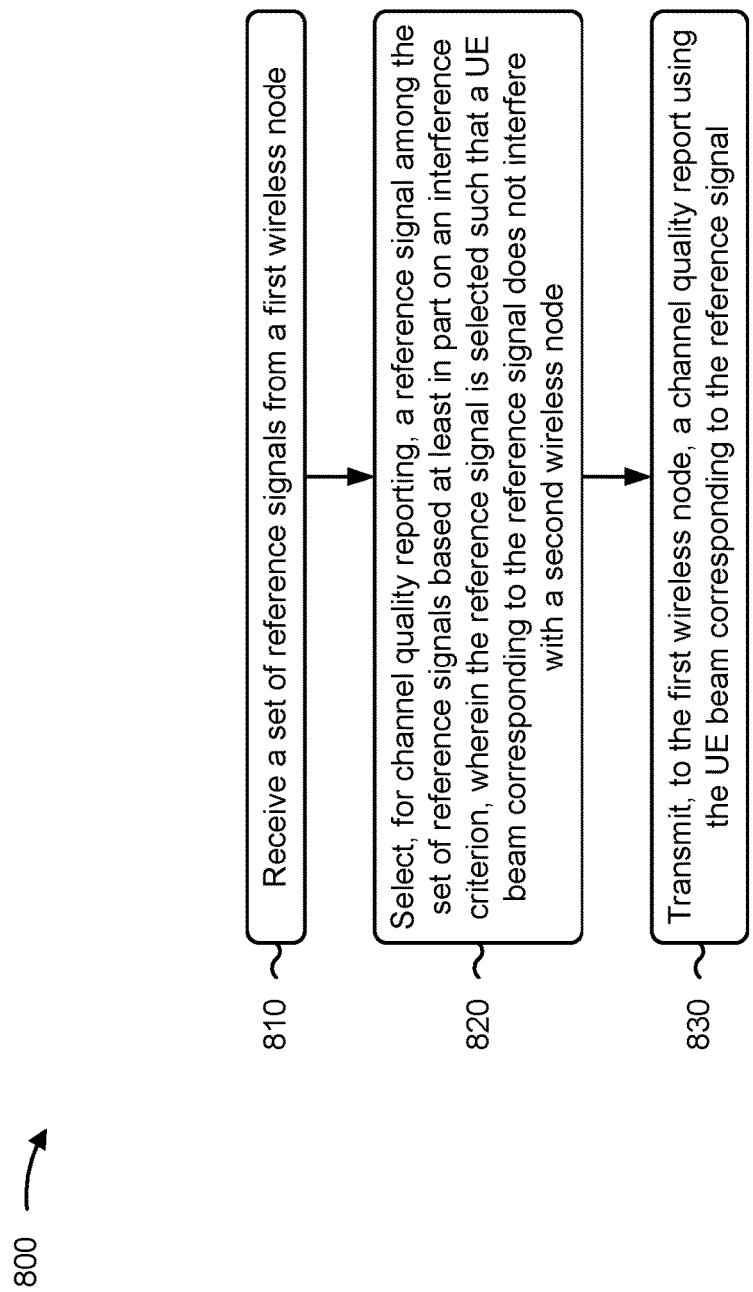
FIG. 8 is a diagram illustrating an example process performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 and/or the like) performs operations associated with selecting an uplink beam.

As shown in FIG. 8, in some aspects, process 800 may include receiving a set of reference signals from a first wireless node (block 810). For example, the UE (e.g., using receive processor 258, transmit processor 264, controller/processor 280, memory 282, and/or the like) may receive a set of reference signals from a first wireless node, as described above.

As further shown in FIG. 8, in some aspects, process 800 may include selecting, for channel quality reporting, a reference signal among the set of reference signals based at least in part on an interference criterion, wherein the reference signal is selected such that a UE beam corresponding to the reference signal does not interfere with a second wireless node (block 820). For example, the UE (e.g., using receive processor 258, transmit processor 264, controller/processor 280, memory 282, and/or the like) may select, for channel quality reporting, a reference signal among the set of reference signals based at least in part on an interference criterion, as described above. In some aspects, the reference signal is selected such that a UE beam corresponding to the reference signal does not interfere with a second wireless node.

As further shown in FIG. 8, in some aspects, process 800 may include transmitting, to the first wireless node, a channel quality report using the UE beam corresponding to the reference signal (block 830). For example, the UE (e.g., using receive processor 258, transmit processor 264, controller/processor 280, memory 282, and/or the like) may transmit, to the first wireless node, a channel quality report using the UE beam corresponding to the reference signal, as described above.

Process 800 may include additional aspects, such as any single aspect or any combination of aspects described below and/or in connection with one or more other processes described elsewhere herein.

In a first aspect, selecting the reference signal includes selecting the reference signal based at least in part on a channel quality of a neighbor cell associated with the second wireless node.

In a second aspect, alone or in combination with the first aspect, the channel quality of the neighbor cell is at least one of a threshold reference signal received power, a threshold received signal strength indicator, or reference signal received quality.

In a third aspect, alone or in combination with one or more of the first and second aspects, selecting the reference signal includes selecting the reference signal based at least in part on a channel quality of a serving cell of the first wireless node.

In a fourth aspect, alone or in combination with one or more of the first through third aspects, the channel quality is a threshold level of a reference signal received quality.

In a fifth aspect, alone or in combination with one or more of the first through fourth aspects, the threshold is defined in a specification or network-configurable.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
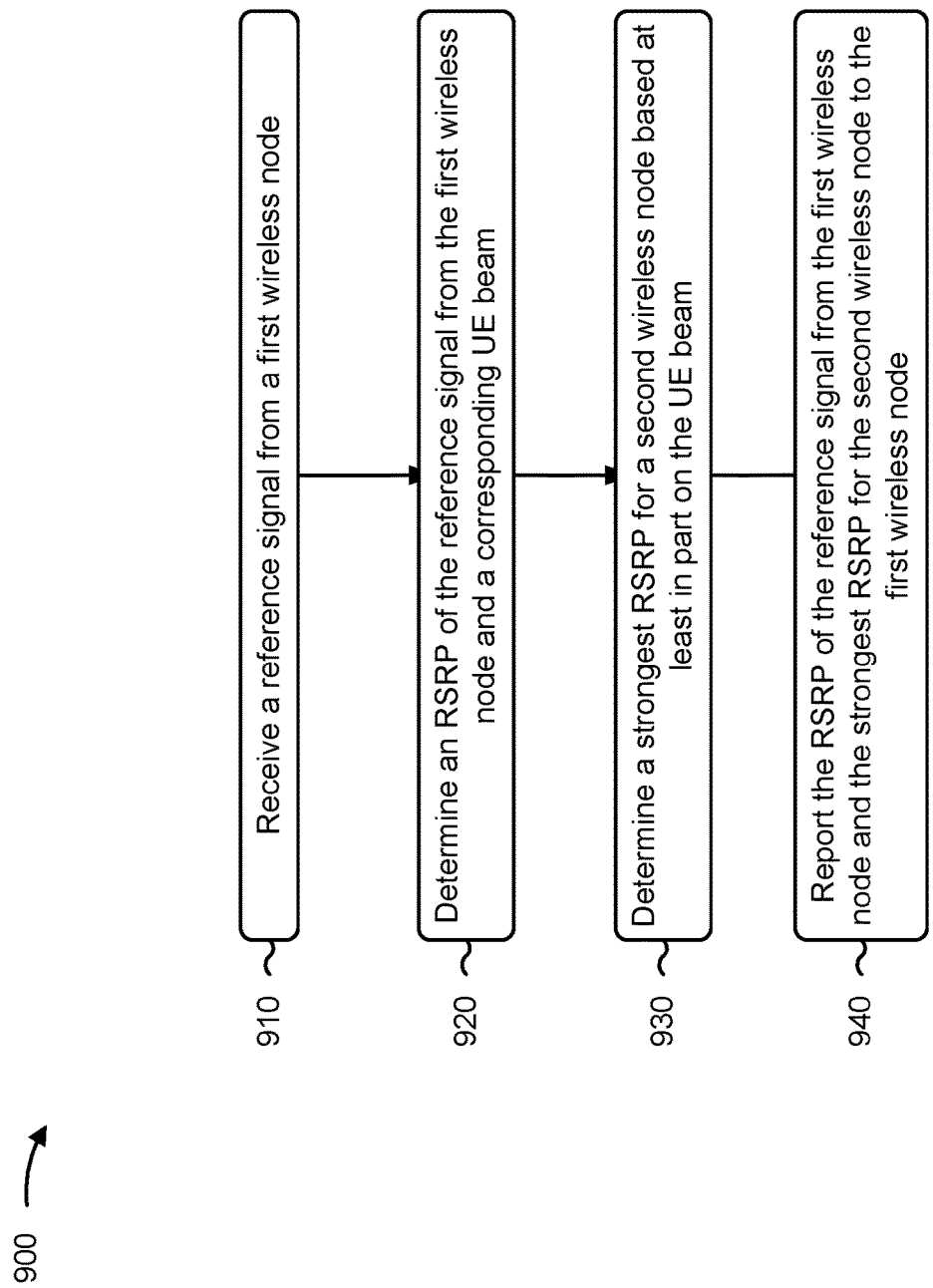
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with selecting an uplink beam.

As shown in FIG. 9, in some aspects, process 900 may include receiving a reference signal from a first wireless node (block 910). For example, the UE (e.g., using receive processor 258, transmit processor 264, controller/processor 280, memory 282, and/or the like) may receive a reference signal from a first wireless node, as described above.

As further shown in FIG. 9, in some aspects, process 900 may include determining a signal quality of the reference signal from the first wireless node and a corresponding UE beam (block 920). For example, the UE (e.g., using receive processor 258, transmit processor 264, controller/processor 280, memory 282, and/or the like) may determine a signal quality of the reference signal from the first wireless node and a corresponding UE beam, as described above.

As further shown in FIG. 9, in some aspects, process 900 may include determining a strongest signal quality for a second wireless node based at least in part on the UE beam (block 930). For example, the UE (e.g., using receive processor 258, transmit processor 264, controller/processor 280, memory 282, and/or the like) may determine a strongest signal quality for a second wireless node based at least in part on the UE beam, as described above.

As further shown in FIG. 9, in some aspects, process 900 may include reporting the signal quality of the reference signal from the first wireless node and the strongest signal quality for the second wireless node to the first wireless node (block 940). For example, the UE (e.g., using receive processor 258, transmit processor 264, controller/processor 280, memory 282, and/or the like) may report the signal quality of the reference signal from the first wireless node and the strongest signal quality for the second wireless node to the first wireless node, as described above.

Process 900 may include additional aspects, such as any single aspect or any combination of aspects described herein and/or in connection with one or more other processes described elsewhere herein.

In a first aspect, the signal quality is based at least in part on a reference signal received power (RSRP).

In a second aspect, alone or in combination with the first aspect, the signal quality is based at least in part on at least one of: a reference signal received quality (RSRQ), a channel quality information (CQI) parameter, or a received signal strength indicator (RSSI) parameter.

In a third aspect, alone or in combination with the first aspect, the signal quality is an RSRP.

In a fourth aspect, alone or in combination with the second aspect, the signal quality is an RSRQ, a CQI, or an RSSI.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
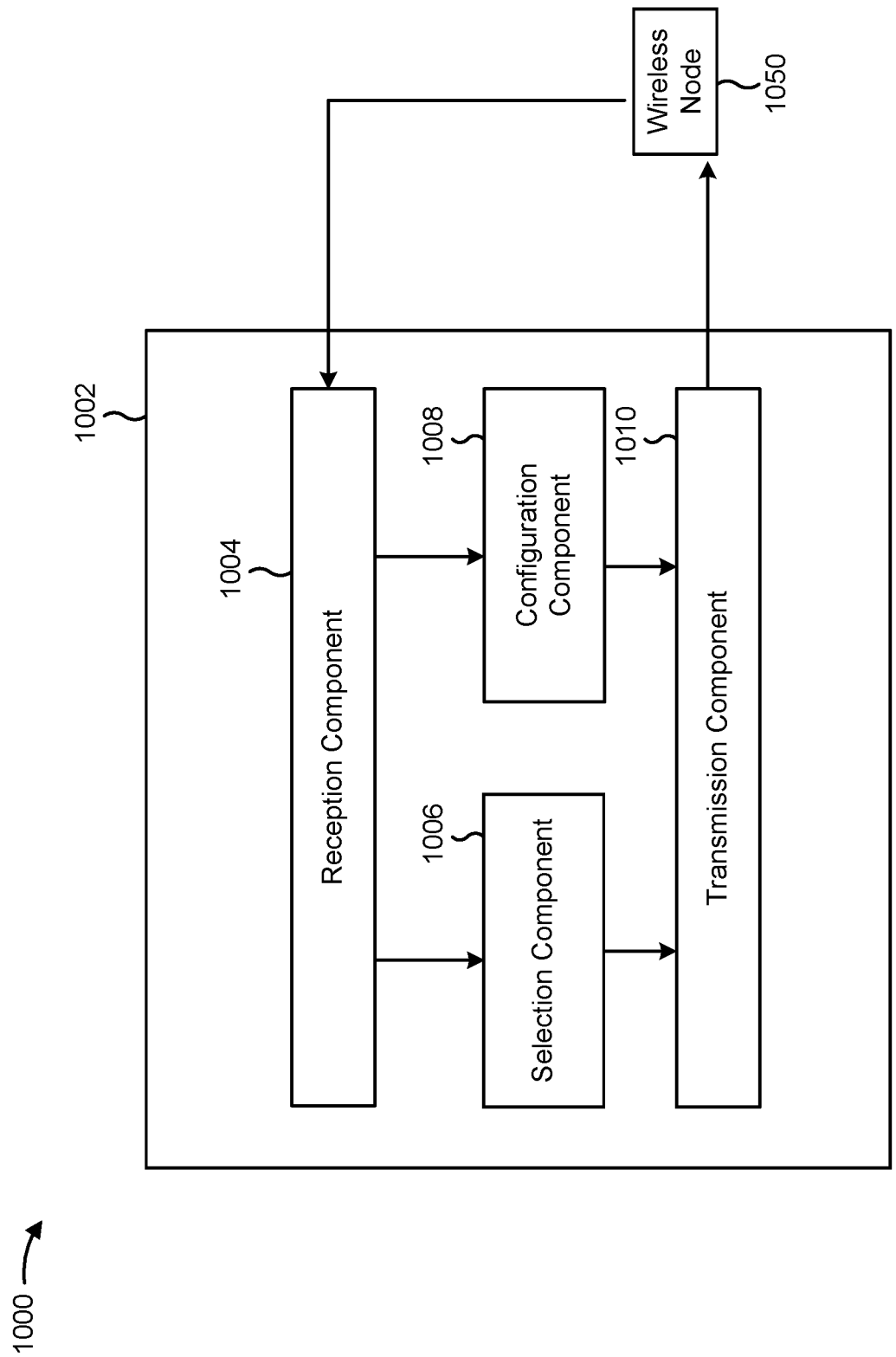
FIGS. 10-11 are block diagrams of example apparatuses, in accordance with various aspects of the present disclosure.

FIG. 10 is a conceptual data flow diagram 1000 illustrating a data flow between different components in an example apparatus 1002. The apparatus 1002 may be a wireless communication device (e.g., BS 110, UE 120, IAB donor 405, IAB nodes 410, IAB nodes 510, and/or the like). In some aspects, the apparatus 1002 includes a reception component 1004, a selection component 1006, a configuration component 1008, and/or transmission component 1010.

Reception component 1004 may receive reporting regarding a channel quality. For example, reception component 1004 may receive information from an inferior node, such as wireless node 1050 (e.g., which may be a BS 110, a UE 120, an IAB node 410, an IAB node 510, and/or the like), identifying a result of wireless node 1050 performing a measurement of a reference signal transmitted by the apparatus 1002. Additionally, or alternatively, reception component 1004 may receive a set of reference signals from a superior node, such as wireless node 1050), and may perform a set of measurements on a set of reference signals. In some aspects, selection component 1006 may select a reference signal based at least in part on receiving information associated with the set of reference signals. In some aspects, configuration component 1008 may configure communication parameters, such as for wireless node 1050, based at least in part on receiving information associated with the set of reference signals. In some aspects, transmission component 1010 may transmit the set of reference signals and/or a report regarding measurements thereof. Additionally, or alternatively, transmission component 1010 may transmit configuration information identifying a configuration, determined based at least in part on information associated with a set of reference signals, for an uplink transmission.

The apparatus may include additional components that perform each of the blocks of the algorithm in the aforementioned process 600 of FIG. 6, process 700 of FIG. 7, and/or the like. Each block in the aforementioned process 600 of FIG. 6, process 700 of FIG. 7, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of components (e.g., one or more components) shown in FIG. 10 may perform one or more functions described as being performed by another set of components shown in FIG. 10.

Figure 11:
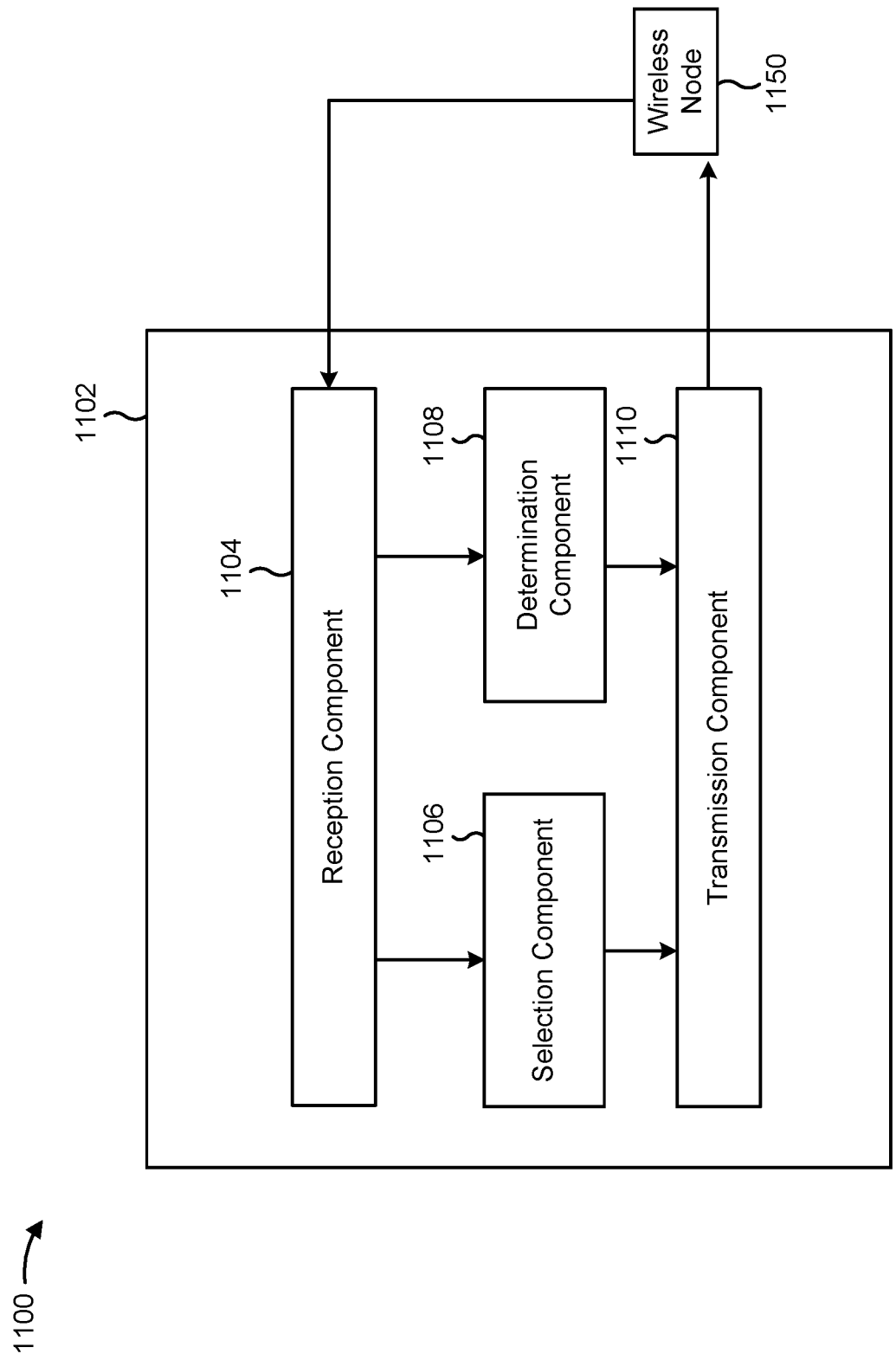

FIG. 11 is a conceptual data flow diagram 1100 illustrating a data flow between different components in an example apparatus 1102. The apparatus 1102 may be a user equipment (e.g., UE 120). In some aspects, the apparatus 1102 includes a reception component 1104, a selection component 1106, a determination component 1108, and/or a transmission component 1110.

Reception component 1104 may receive a set of reference signals from, for example, wireless node 1150. For example, reception component 1104 may receive a CSI reference signal, a tracking reference signal, an SSB, and/or the like. Based at least in part on receiving the set of reference signals and/or performing a set of measurements thereof, selection component 1106 may select a reference signal for channel quality reporting. For example, selection component 1106 may select the reference signal from the set of reference signals to achieve less than a threshold level of interference with another wireless node when transmitting reporting. In some aspects, selection component 1106 may select the reference signal based at least in part on determination component 1108 determining, for example, an RSRP of the set of reference signals, a strongest RSRP for another wireless node, and/or the like. Based at least in part on selecting the reference signal, transmission component 1110 may transmit reporting regarding the selected reference signal, the set of measurements, and/or the like.

The apparatus may include additional components that perform each of the blocks of the algorithm in the aforementioned process 800 of FIG. 8, process 900 of FIG. 9, and/or the like. Each block in the aforementioned process 800 of FIG. 8, process 900 of FIG. 9, and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

The following provides an overview of aspects of the present disclosure:

Aspect 1: A method of wireless communication performed by a wireless communication device, comprising: transmitting a set of reference signals to a first wireless node; receiving information identifying a transmit power capability of the first wireless node based at least in part on transmitting the set of reference signals; and configuring one or more transmission parameters for a first link with the first wireless node or a second link with a second wireless node based at least in part on the transmit power capability of the first wireless node.

Aspect 2: The method of aspect 1, wherein configuring the one or more transmission parameters comprises: configuring the one or more transmission parameters based at least in part on at least one of a specification definition or a power class of the first wireless node.

Aspect 3: The method of any of aspects 1 to 2, wherein the transmit power capability is determined based at least in part on a measurement of the set of reference signals.

Aspect 4: The method of any of aspects 1 to 3, wherein the one or more transmission parameters are based at least in part on a received beam-correspondence indication.

Aspect 5: The method of any of aspects 1 to 4, further comprising: determining a power threshold; providing information identifying the power threshold to the second wireless node; receiving a reference signal report from the second wireless node based at least in part on providing the information identifying the power threshold; and wherein configuring the one or more transmission parameters comprises: configuring the one or more transmission parameters based at least in part on the reference signal report. wherein configuring the one or more transmission parameters comprises: configuring the one or more transmission parameters based at least in part on the reference signal report.

Aspect 6: The method of any of aspects 1 to 5, wherein configuring the one or more transmission parameters comprises: configuring uplink sounding reference signal sweeping for the second wireless node.

Aspect 7: The method of aspect 6, wherein the uplink sounding reference signal is based at least in part on a reference signal received power for the first link.

Aspect 8: The method of any of aspects 6 to 7, wherein a downlink beam pair selected for the first link is different from an uplink beam selected for the second link.

Aspect 9: The method of any of aspects 6 to 8, wherein a transmission configuration indicator state for the first link is different from a spatial relation for the second link.

Aspect 10: The method of any of aspects 1 to 9, wherein configuring the one or more transmission parameters comprises: altering a receive beam configuration for the first link.

Aspect 11: The method of aspect 10, wherein altering the receive beam configuration comprises: altering a beam direction or beam spread.

Aspect 12: A method of wireless communication performed by a wireless communication device, comprising: transmitting a plurality of repetitions of a set of reference signals; receiving a report of a set of channel quality measurements based at least in part on the transmission of the plurality of repetitions; and selecting a reference signal based at least in part on the plurality of repetitions of the set of reference signals to enable receipt of an uplink transmission from a first wireless node associated with a first link, of a plurality of wireless nodes associated with a plurality of links, based at least in part on the report.

Aspect 13: The method of aspect 12, further comprising: selecting a receive beam for the uplink transmission based at least in part on a transmission time of the selected reference signal among the plurality of the repetitions of the set of reference signals.

Aspect 14: The method of any of aspects 12 to 13, wherein the selected reference signal is at least one of: a synchronization signal block, a channel state information reference signal, or a tracking reference signal.

Aspect 15: The method of any of aspects 12 to 14, wherein the set of channel quality measurements includes at least one of: a reference signal received power measurement, a reference signal received quality measurement, a received signal strength indicator value, or a signal to interference noise ratio measurement.

Aspect 16: The method of any of aspects 12 to 15, further comprising: causing the first wireless node to sweep a plurality of quasi co-located receive beams; and wherein selecting the reference signal comprises: selecting the reference signal based at least in part on causing the first wireless node to sweep the plurality of quasi co-located receive beams. wherein selecting the reference signal comprises: selecting the reference signal based at least in part on causing the first wireless node to sweep the plurality of quasi co-located receive beams.

Aspect 17: A method of wireless communication performed by a user equipment (UE), comprising: receiving a set of reference signals from a first wireless node; selecting, for channel quality reporting, a reference signal among the set of reference signals based at least in part on an interference criterion, wherein the reference signal is selected such that a UE beam corresponding to the reference signal does not interfere with a second wireless node; and transmitting, to the first wireless node, a channel quality report using the UE beam corresponding to the reference signal.

Aspect 18: The method of aspect 17, wherein selecting the reference signal comprises: selecting the reference signal based at least in part on a channel quality of a neighbor cell associated with the second wireless node.

Aspect 19: The method of aspect 18, where the channel quality of the neighbor cell is at least one of a threshold reference signal received power, a threshold received signal strength indicator, or reference signal received quality.

Aspect 20: The method of any of aspects 17 to 19, wherein selecting the reference signal comprises: selecting the reference signal based at least in part on a channel quality of a serving cell of the first wireless node.

Aspect 21: The method of aspect 20, wherein the channel quality is a threshold level of a reference signal received quality.

Aspect 22: The method of aspect 21, wherein the threshold is defined in a specification or network-configurable.

Aspect 23: A method of wireless communication performed by a user equipment (UE), comprising: receiving a reference signal from a first wireless node; determining a reference signal received power (RSRP) of the reference signal from the first wireless node and a corresponding UE beam; determining a strongest RSRP for a second wireless node based at least in part on the UE beam; and reporting the RSRP of the reference signal from the first wireless node and the strongest RSRP for the second wireless node to the first wireless node.

Aspect 24: The method of aspect 23, wherein the signal quality is based at least in part on a reference signal received power (RSRP).

Aspect 25: The method of any of aspects 23 to 24, wherein the signal quality is based at least in part on at least one of: a reference signal received quality (RSRQ), a channel quality information (CQI) parameter, or a received signal strength indicator (RSSI) parameter.

Aspect 26: An apparatus for wireless communication at a device, comprising a processor; memory coupled with the processor; and instructions stored in the memory and executable by the processor to cause the apparatus to perform the method of one or more aspects of aspects 1-11.

Aspect 27: A device for wireless communication, comprising a memory and one or more processors coupled to the memory, the memory and the one or more processors configured to perform the method of one or more aspects of aspects 1-11.

Aspect 28: An apparatus for wireless communication, comprising at least one means for performing the method of one or more aspects of aspects 1-11.

Aspect 29: A non-transitory computer-readable medium storing code for wireless communication, the code comprising instructions executable by a processor to perform the method of one or more aspects of aspects 1-11.

Aspect 30: A non-transitory computer-readable medium storing a set of instructions for wireless communication, the set of instructions comprising one or more instructions that, when executed by one or more processors of a device, cause the device to perform the method of one or more aspects of aspects 1-11.

Aspect 31: An apparatus for wireless communication at a device, comprising a processor; memory coupled with the processor; and instructions stored in the memory and executable by the processor to cause the apparatus to perform the method of one or more aspects of aspects 12-16.

Aspect 32: A device for wireless communication, comprising a memory and one or more processors coupled to the memory, the memory and the one or more processors configured to perform the method of one or more aspects of aspects 12-16.

Aspect 33: An apparatus for wireless communication, comprising at least one means for performing the method of one or more aspects of aspects 12-16.

Aspect 34: A non-transitory computer-readable medium storing code for wireless communication, the code comprising instructions executable by a processor to perform the method of one or more aspects of aspects 12-16.

Aspect 35: A non-transitory computer-readable medium storing a set of instructions for wireless communication, the set of instructions comprising one or more instructions that, when executed by one or more processors of a device, cause the device to perform the method of one or more aspects of aspects 12-16.

Aspect 36: An apparatus for wireless communication at a device, comprising a processor; memory coupled with the processor; and instructions stored in the memory and executable by the processor to cause the apparatus to perform the method of one or more aspects of aspects 17-22.

Aspect 37: A device for wireless communication, comprising a memory and one or more processors coupled to the memory, the memory and the one or more processors configured to perform the method of one or more aspects of aspects 17-22.

Aspect 38: An apparatus for wireless communication, comprising at least one means for performing the method of one or more aspects of aspects 17-22.

Aspect 39: A non-transitory computer-readable medium storing code for wireless communication, the code comprising instructions executable by a processor to perform the method of one or more aspects of aspects 17-22.

Aspect 40: A non-transitory computer-readable medium storing a set of instructions for wireless communication, the set of instructions comprising one or more instructions that, when executed by one or more processors of a device, cause the device to perform the method of one or more aspects of aspects 17-22.

Aspect 41: An apparatus for wireless communication at a device, comprising a processor; memory coupled with the processor; and instructions stored in the memory and executable by the processor to cause the apparatus to perform the method of one or more aspects of aspects 23-25.

Aspect 42: A device for wireless communication, comprising a memory and one or more processors coupled to the memory, the memory and the one or more processors configured to perform the method of one or more aspects of aspects 23-25.

Aspect 43: An apparatus for wireless communication, comprising at least one means for performing the method of one or more aspects of aspects 23-25.

Aspect 44: A non-transitory computer-readable medium storing code for wireless communication, the code comprising instructions executable by a processor to perform the method of one or more aspects of aspects 23-25.

Aspect 45: A non-transitory computer-readable medium storing a set of instructions for wireless communication, the set of instructions comprising one or more instructions that, when executed by one or more processors of a device, cause the device to perform the method of one or more aspects of aspects 23-25.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a parent integrated access and backhaul (IAB) node, comprising:
   transmitting, to a child IAB node, a plurality of repetitions of a set of reference signals;
   receiving, from the child IAB node, a report of a set of channel quality measurements based at least in part on the transmission of the plurality of repetitions; and
   selecting a receive beam, of a plurality of receive beams for receiving communications from the parent IAB node, that corresponds to a reference signal based at least in part on the report and the plurality of repetitions of the set of reference signals to enable receipt of an uplink transmission from the child IAB node, the child IAB node being associated with a first link, of a plurality of links between the parent IAB node and a plurality of wireless devices associated with the plurality of links.

2. The method of claim 1, further comprising:
selecting the receive beam for the uplink transmission based at least in part on a transmission time of the reference signal among the plurality of the repetitions of the set of reference signals.

3. The method of claim 1, wherein the reference signal is at least one of:
a synchronization signal block,
a channel state information reference signal, or
a tracking reference signal.

4. The method of claim 1, wherein the set of channel quality measurements includes at least one of:
a reference signal received power measurement,
a reference signal received quality measurement,
a received signal strength indicator value, or
a signal to interference noise ratio measurement.

5. The method of claim 1, further comprising:
causing the child IAB node to sweep a plurality of quasi co-located receive beams; and
wherein selecting the receive beam comprises:
selecting the receive beam based at least in part on causing the child IAB node to sweep the plurality of quasi co-located receive beams.

6. A parent integrated access and backhaul (IAB) node for wireless communication, comprising:
a memory; and
one or more processors, coupled to the memory, configured to:
transmit, to a child IAB node, a plurality of repetitions of a set of reference signals;
receive, from the child IAB node, a report of a set of channel quality measurements based at least in part on the plurality of repetitions; and
select a receive beam, of a plurality of receive beams for receiving communications from the parent IAB node, that corresponds to a reference signal based at least in part on the report and the plurality of repetitions of the set of reference signals to enable receipt of an uplink transmission from the child IAB node,
the child IAB node being associated with a first link, of a plurality of links between the parent IAB node and a plurality of wireless devices associated with the plurality of links.

7. The parent IAB node of claim 6, wherein the one or more processors are further configured to:
select the receive beam for the uplink transmission based at least in part on a transmission time of the reference signal among the plurality of the repetitions of the set of reference signals.

8. The parent IAB node of claim 6, wherein the reference signal is at least one of:
a synchronization signal block,
a channel state information reference signal, or
a tracking reference signal.

9. The parent IAB node of claim 6, wherein the set of channel quality measurements includes at least one of:
a reference signal received power measurement,
a reference signal received quality measurement,
a received signal strength indicator value, or
a signal to interference noise ratio measurement.

10. The parent IAB node of claim 6, wherein the one or more processors are further configured to:

cause the child IAB node to sweep a plurality of quasi co-located receive beams; and
wherein the one or more processors, to select the receive beam, are configured to:
select the receive beam based at least in part on causing the child IAB node to sweep the plurality of quasi co-located receive beams.

11. A non-transitory computer-readable medium storing a set of instructions for wireless communication, the set of instructions comprising:
one or more instructions that, when executed by one or more processors of a parent integrated access and backhaul (IAB) node, cause the parent IAB node to:
transmit, to a child IAB node, a plurality of repetitions of a set of reference signals;
receive, from the child IAB node, a report of a set of channel quality measurements based at least in part on the plurality of repetitions; and
select a receive beam, of a plurality of receive beams for receiving communications from the parent IAB node, that corresponds to a reference signal based at least in part on the report and the plurality of repetitions of the set of reference signals to enable receipt of an uplink transmission from the child IAB node,
the child IAB node being associated with a first link, of a plurality of links between the parent IAB node and a plurality of wireless devices associated with the plurality of links.

12. The non-transitory computer-readable medium of claim 11, wherein the one or more instructions further cause the parent IAB node to:
select the receive beam for the uplink transmission based at least in part on a transmission time of the reference signal among the plurality of the repetitions of the set of reference signals.

13. The non-transitory computer-readable medium of claim 11, wherein the reference signal is at least one of:
a synchronization signal block,
a channel state information reference signal, or
a tracking reference signal.

14. The non-transitory computer-readable medium of claim 11, wherein the set of channel quality measurements includes at least one of:
a reference signal received power measurement,
a reference signal received quality measurement,
a received signal strength indicator value, or
a signal to interference noise ratio measurement.

15. The non-transitory computer-readable medium of claim 11, wherein the one or more instructions further cause the parent IAB node to:
cause the child IAB node to sweep a plurality of quasi co-located receive beams; and
wherein the one or more instructions, that cause the parent IAB node to select the receive beam, cause the parent IAB node to:
select the receive beam based at least in part on causing the child IAB node to sweep the plurality of quasi co-located receive beams.

16. A parent integrated access and backhaul (IAB) node for wireless communication, comprising:
means for transmitting, to a child IAB node, a plurality of repetitions of a set of reference signals;
means for receiving, from the child IAB node, a report of a set of channel quality measurements based at least in part on the transmission of the plurality of repetitions; and means for selecting a receive beam, of a plurality of receive beams for receiving communications from the parent IAB node, that corresponds to a reference signal based at least in part on the report and the plurality of repetitions of the set of reference signals to enable receipt of an uplink transmission from the child IAB node,
  the child IAB node being associated with a first link, of a plurality of links between the parent IAB node and a plurality of wireless devices associated with the plurality of links.

17. The parent IAB node of claim 16, further comprising:
means for selecting the receive beam for the uplink transmission based at least in part on a transmission time of the reference signal among the plurality of the repetitions of the set of reference signals.

18. The parent IAB node of claim 16, wherein the reference signal is at least one of:
  a synchronization signal block,
  a channel state information reference signal, or
  a tracking reference signal.

19. The parent IAB node of claim 16, wherein the set of channel quality measurements includes at least one of:
  a reference signal received power measurement,
  a reference signal received quality measurement,
  a received signal strength indicator value, or
  a signal to interference noise ratio measurement.

20. The parent IAB node of claim 16, further comprising:
  means for causing the child IAB node to sweep a plurality of quasi co-located receive beams; and
  wherein the means for selecting the receive beam comprises:
    means for selecting the receive beam based at least in part on causing the child IAB node to sweep the plurality of quasi co-located receive beams.

* * * * *